(12) United States Patent
Duhan

(10) Patent No.: US 11,924,340 B2
(45) Date of Patent: Mar. 5, 2024

(54) CRYPTOGRAPHICALLY SECURE SHUFFLE WITH MULTI-LAYER RANDOMNESS

(71) Applicant: Oracle International Corporation, Redwood Shores, CA (US)

(72) Inventor: Suren Duhan, Bengaluru (IN)

(73) Assignee: Oracle International Corporation, Redwood Shores, CA (US)

( * ) Notice: Subject to any disclaimer, the term of this patent is extended or adjusted under 35 U.S.C. 154(b) by 41 days.

(21) Appl. No.: 17/697,376

(22) Filed: Mar. 17, 2022

(65) Prior Publication Data

US 2023/0171095 A1    Jun. 1, 2023

(51) Int. Cl.
*H04L 9/08* (2006.01)

(52) U.S. Cl.
CPC .......... *H04L 9/0869* (2013.01); *H04L 9/0827* (2013.01); *H04L 9/085* (2013.01)

(58) Field of Classification Search
None
See application file for complete search history.

(56) References Cited

U.S. PATENT DOCUMENTS

| | | | | |
|---|---|---|---|---|
| 8,429,255 B1 * | 4/2013 | Khan | ...... | H04L 47/10 |
| | | | | 709/221 |
| 8,910,114 B2 * | 12/2014 | Loenko | ...... | G06F 8/447 |
| | | | | 717/106 |
| 10,430,389 B1 * | 10/2019 | Gupta | ...... | G06F 16/13 |
| 2015/0379430 A1 * | 12/2015 | Dirac | ...... | G06N 20/00 |
| | | | | 706/12 |
| 2016/0127123 A1 * | 5/2016 | Johnson | ...... | H04L 9/003 |
| | | | | 713/189 |

FOREIGN PATENT DOCUMENTS

EP         0563624 A2 *    8/1993    ............... G06F 9/46

* cited by examiner

*Primary Examiner* — Sanchit K Sarker
(74) *Attorney, Agent, or Firm* — Kilpatrick Townsend & Stockton LLP

(57) ABSTRACT

Techniques are disclosed for cryptographically secure shuffling processes for generating and utilizing secrets in an infrastructure-as-a-service (IaaS) environment. In an embodiment, a method comprises generating a source list and a destination list, the source list and destination list association with a sequential format and the source list comprising a plurality of elements in the sequential format; generating a first random number and a second random number; determining a first element in the source list, the first element corresponding to a position in the sequential format of the source list based on the first random number; determining a first destination position in the destination list, the first destination position corresponding to a position in the sequential format of the destination list based on the second random number; and updating the destination list to include the first element in the source list at the first destination position.

16 Claims, 9 Drawing Sheets

CRYPTOGRAPHICALLY SECURE SHUFFLE WITH MULTI-LAYER RANDOMNESS

CROSS-REFERENCES TO RELATED APPLICATIONS

The present application claims the benefit of Indian provisional application number 202141055453, filed Nov. 30, 2021, which is incorporated by reference.

BACKGROUND

A cloud service provider (CSP) can offer a variety of services to customers. For example, a CSP may own and/or operate cloud-based storage and computing resources that are made available to their customers. Customers may utilize the cloud-based computing resources to store their own data using physical infrastructure implemented by the service provider. Facilitating a cloud infrastructure involves numerous security considerations, including how to grant access to a valid party while preventing invalid parties from accessing the same data. This is especially important when a customer's data is highly sensitive and stored in the cloud infrastructure.

BRIEF SUMMARY

Aspects of the present disclosure include techniques for utilizing a cryptographically secure shuffle for the generation of secure secrets. Specifically, a secure shuffle technique is utilized to generate far less predictable secrets for use in secure operations. A device/system utilizes multiple layers of secure random number generation to generate a secure secret that a malicious third party cannot easily predict. The device/system will utilize a set of rules and multiple iterations of a secure random number generator to effectively generate and securely "shuffle" element of a secure secret to greatly reduce predictability. The device/system may periodically and automatically be triggered to regenerate the secure secrets using the cryptographically secure shuffle to increase secret security.

An example method comprises generating a source list and a destination list, the source list and destination list associated with a sequential format and the source list comprising a plurality of elements in the sequential format; generating a first random number and a second random number; determining a first element in the source list, the first element corresponding to a position in the sequential format of the source list based on the first random number; determining a first destination position in the destination list, the first destination position corresponding to a position in the sequential format of the destination list based on the second random number; and updating the destination list to include the first element in the source list at the first destination position.

In some examples, the method further comprises updating the source list by deleting the first element in the source list from the source list. In further examples, the method comprises generating a third random number and a fourth random number; determining a second element in the source list, the second element corresponding to a position in the sequential format of the source list based on the third random number; determining a second destination position in the destination list, the second destination position corresponding to a position in the sequential format of the destination list based on the fourth random number; and updating the destination list to include the second element in the source list at the second destination position. In some further examples, the method comprises repeating the steps of generating random numbers and updating the destination list to include the plurality of elements until the source list is empty.

In some examples, the method further comprises receiving a request to generate a cryptographically secure secret; and generating, based on the destination list, the cryptographically secure secret, wherein the cryptographically secure secret is generated automatically and in response to receiving the request to generate the cryptographically secure secret. In some further examples, the cryptographically secure secret is generated at least in part by compressing the destination list into a string of characters corresponding to a plurality of elements in the destination list. In other example processes, the request to generate a cryptographically secure secret is generated by a secret facilitation service automatically after a fixed period, and the generated cryptographically secure secret to output to the secret facilitation service to replace a previously cryptographically secure secret that was previously stored during a previous interval of the fixed period of time.

In some examples, generating the source list comprises determining a set of list rules and a set of element lists; and selecting a plurality of elements for inclusion in the source list based on the set of list rules. In some further examples, at least one rule of the set of list rules specifies that a minimum number of elements of at least one element type is selected for inclusion in the source list. In other examples, generating the source list further comprises inserting the selected plurality of elements into the source list in the sequential format based at least on one or more generated positional random numbers.

Another aspect of the present disclosure comprises a computing device comprising one or more processors and a non-transitory computer-readable media that includes instructions that, when executed by the one or more processors, cause the one or more processors to perform the methods described above.

Another aspect of the present disclosure comprises a non-transitory computer-readable media that includes instructions that, when executed by one or more processors, cause the one or more processors to perform the methods described above.

These illustrative embodiments are mentioned not to limit or define the disclosure, but to provide examples to aid understanding thereof. Additional embodiments are discussed in the Detailed Description, and further description is provided there.

DETAILED DESCRIPTION

Figure 1:
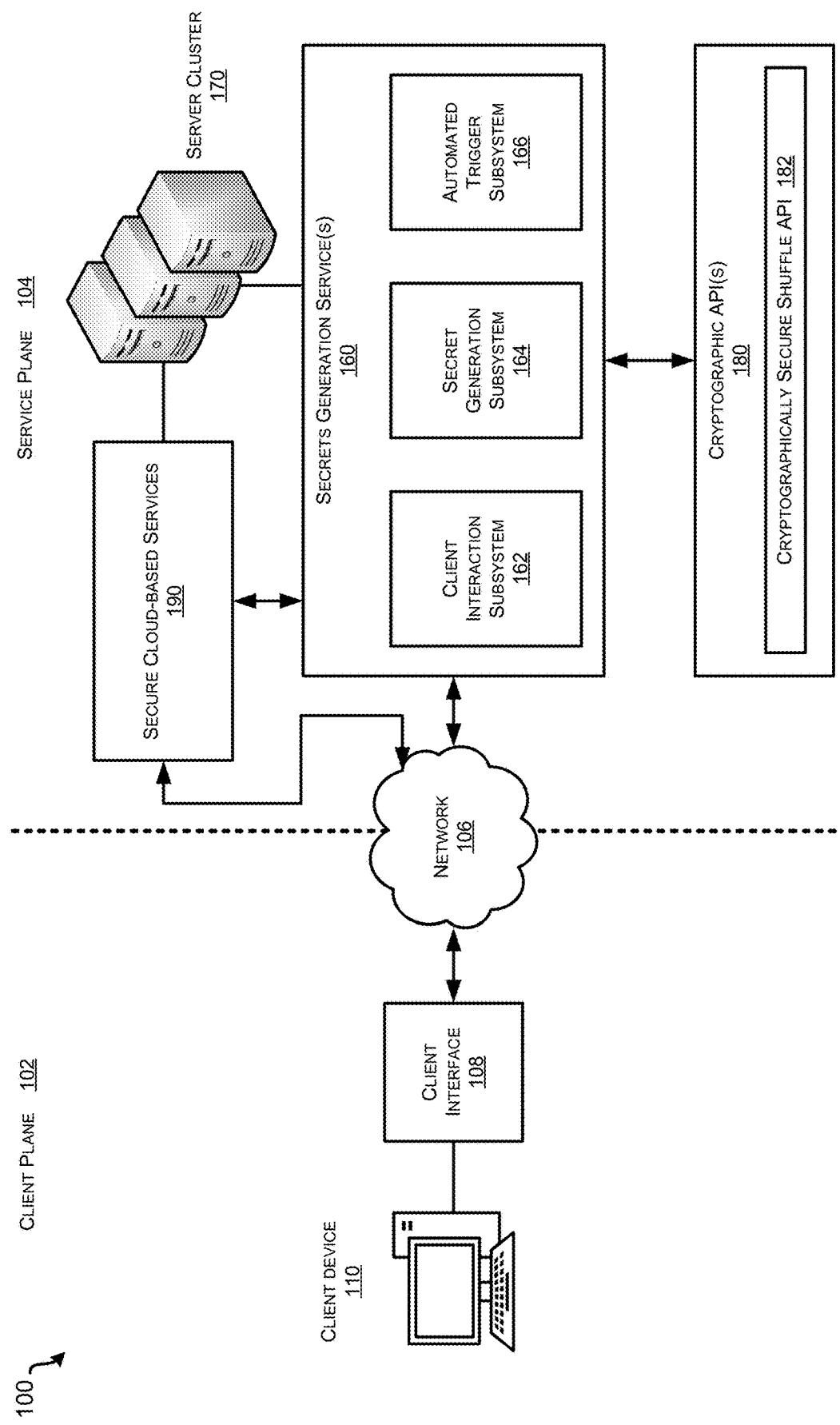
FIG. 1 is a block diagram of a distributed infrastructure-as-a service system for facilitating a cloud-based service for generating cryptographically secure secrets according to certain embodiments of the present disclosure.

In the following description, for the purposes of explanation, specific details are set forth in order to provide a thorough understanding of certain embodiments. However, it will be apparent that various embodiments may be practiced without these specific details. The figures and description are not intended to be restrictive.

A cloud-services provider may offer services that a client (also referred to herein as "users," "customers," and "subscribers") can subscribe to. Cloud-based computing services allow the client to utilize cloud-based resources owned and operated by the service provider for the client's own services and applications. For example, a cloud-services provider may make storage and compute resources at a cloud server available to the customer. The storage resources can be digital storage space in a computer memory in which a client may store their data or that can be used to store intermediary data for executing processes on behalf of the client.

The cloud-based services may be accessed by the client through a web portal or other networking processes in order to utilize the client's resources. In order to facilitate secure access through the network, a cloud-services provider may utilize a secret or other "password" type dataset that is made available to the customer through a separate cloud-based service. Only entities having access to the secret may utilize portions of the cloud-based service associated with the customer.

The cloud-based service provider may generate and send a customer a new secret over regular time intervals. The secrets are often generated at least partially based on the input of a human operator to ensure secure secrets are generated. A secure secret is secure if it is difficult to simply guess or reverse-engineering using simple algorithms, for example, by including randomly generated numbers, symbols, case-sensitive characters, etc. However, it is inefficient for a human operator to assist in generating these secure secrets, especially as the number of secrets generated and the number of customers served is large. Additionally, though the secrets generated may be secure against simple brute-force guessing algorithms, they are not often cryptographically secure. A cryptographically secure secret is a secret that is not easily reverse engineered using cryptographic prediction techniques that can utilize a set of known rules or patterns to attempt to reverse engineer a secret. For example, though a regularly-secure secret may utilize random numbers, symbols, and case-sensitive characters, a cryptographic decryption function may utilize these parameters to execute a cryptographic process to guess a secret. For example, standard random number generators utilize known seeds for generating numbers in a deterministic fashion, and a secret may require that symbols and characters be used in a minimum number. Based on these parameters, a regularly-secure secret is more predictable for a cryptographic function.

In various embodiments described herein, techniques for automatically generating cryptographically secure secrets using a cryptographically secure shuffle process are described. The automatic generation of cryptographically secure secrets allows for the removal of costly human intervention in the secure secret generation process. The use of a cryptographically secure shuffle allows for the automated generation of cryptographically secure secrets to greatly reduce predictability for the generated secrets.

Environment for Secure Secret Generation

FIG. 1 is a block diagram of a distributed infrastructure-as-a service system 100 for facilitating a cloud-based service for generating cryptographically secure secrets according to certain embodiments of the present disclosure.

The system 100 depicted in FIG. 1 can comprise a client plane 102 and a service plane 104, including systems and devices connected directly or indirectly to a network 106 to form a cloud-based infrastructure. The network 106 may be any communicative entity or medium through which data may be transmitted. For example, the network 106 may be the Internet, an intranet network, a cloud-based network, a local area network, or the like. Various networks that may be used will be recognized by one having ordinary skill in the art, and several are also discussed below.

The network 106 may be communicatively coupled to devices or software-based entities in both the client plane 102 and the service plane 104. For example, the network 106 may be connected to a client interface 108 in the client plane. For example, the client interface 108 may be a series of device and software-based entities configured to interact with or act on behalf of a client (e.g., a customer) utilizing a cloud-based service. The client interface 108 may be an interface or other software-based service configured to connect a client device 110 to a network, such as network 106. For example, as depicted in FIG. 1, the client interface 108 may be implemented by a client device 110. The client device 110 may be any type of device operating in any format necessary to perform the embodiment described herein, and the number of client devices that may comprise an embodiment is not limited. In various embodiments, a client device 110 is a device operable by a client and/or customer to request, generate, display, and/or interact with the client interface 108. For example, a client may initiate software programming instructions to execute an instance of the client interface 108 using processing hardware in the client device 110.

The client interface 108 may be a software-based instance of a graphical user interface (GUI) to be implemented as part of the embodiments described herein. For example, a client may utilize the client device 110 to operate the client interface 108 to communicate with the network 106 and therefore other components of the system 100. In various embodiments, the client interface 108 can establish a connection with network 106 to facilitate the embodiments described herein. For example, the client interface 108 may utilize the network 106 to receive a cryptographically secure secret to be utilized by the client device 110 to access to one or more cloud-based services in service plane 104.

Network 106 may be further communicatively coupled to one or more cloud-based services in the service plane 104. Service plane 104 may be, for example, a series of one or more device or software-based entities operable by or operable on behalf of a cloud-based service provider. In order to access one or more of these services in service plane 104, a client device 110 and/or client interface 108 may be required to obtain and utilize a secure secret. Secure secrets may be generated by secrets generation services(s) 112, which may itself be a cloud-based service operated by a service provider. In various embodiments, secrets generation service(s) 112 may be a cloud-based service operated on a physical infrastructure, such as server cluster 114, to perform secure secret generation for client use. The secure secret generated by secrets generation service(s) 112 may be utilized to access cloud-based services in the service plane 104, including secrets generation services(s) 112 itself.

Secrets generation service(s) 112 may utilize one or more subsystems for automated generation of a cryptographically secure secret according to the embodiments described herein. A subsystem may be a cluster of hardware, software, or combination resources configured to perform the embodiments described herein. For example, secrets generation service(s) 112 may include client interaction subsystem 116. Client interaction subsystem 116 may be a subsystem configured to interact with a client device 110 and/or a client interface 108 to facilitate the embodiments described herein. For example, client interaction subsystem 116 may receive, interpret, and route communications received from client interface 108 via network 106 to other subsystems of secrets generation service(s) 112.

In some embodiments, client interactions subsystem 116 may also send cryptographically secure secrets generated by secrets generation service(s) 112 to client interface 108 via network 106 in order to grant client interface 108 access to other secure cloud services, such as secure cloud-based services 126. For example, secure cloud-based services 126 may be a cloud-based service executing on physical infrastructure such as server cluster 114 and which is accessible by interfacing with a client interface 108 after the client interface sends an appropriate secure secret to the secure cloud-based services 126. The secure cloud-based services 126 may verify the secure secret by comparing it with a secure secret generated by secrets generation service(s) 112. For example, secure cloud-based services 126 may include a cloud-based storage service, which a client interface 108 may access once the client interface has sent the appropriate secure secret to secure cloud-based services 126 and the secure secret has been verified by secrets generation service(s) 112.

Secrets generation service(s) 112 may further include secret generation subsystem 118. Secret generation subsystem 118 may be a subsystem configured to generate cryptographically secure secrets to distribution to customers according to the embodiments described herein. Examples of secret generation which may be implemented by secret generation subsystem 118 are further described with reference to FIG. 3 below.

Secrets generation service(s) 112 may further include automated trigger subsystem 120. Automated trigger subsystem 120 may be configured to cause automated generation of cryptographically secure secrets, for example, at secret generation subsystem 118, during particular time periods and/or in response to particular events. For example, an automated trigger subsystem 120 may automatically track time periods over which a cryptographically secure secret is more likely to be predictable due to the amount of time the cryptographically secure secret has been utilized by secrets generation service(s) 112. Automated trigger subsystem 120 may use this determination to signal the secret generation subsystem 118 to automatically begin the generation of a new cryptographically secure secret. The new cryptographically secure secret can be sent to a client interface 108 to replace an older secret.

Generation of a cryptographically secure secret, for example, by secret generation subsystem 118, may be performed in part or in whole by cryptographic API(s) 122. Cryptographic API(s) 122 may be a set of application programming interfaces (APIs) configured to perform cryptographically secure functions that may be utilized to generate a cryptographically secure secret. For example, cryptographic API(s) 122 may include a set of libraries or files such as cryptographically secure shuffle API 124, which may perform a secure shuffle procedure to generate a less-predictable cryptographically secure secret to be used as part of the embodiments described herein. An example of a cryptographically secure shuffle that may be performed by a cryptographically secure shuffle API 124 is described herein, including with reference to FIG. 2 below.

Techniques for Cryptographically Secure Shuffle

Figure 2:
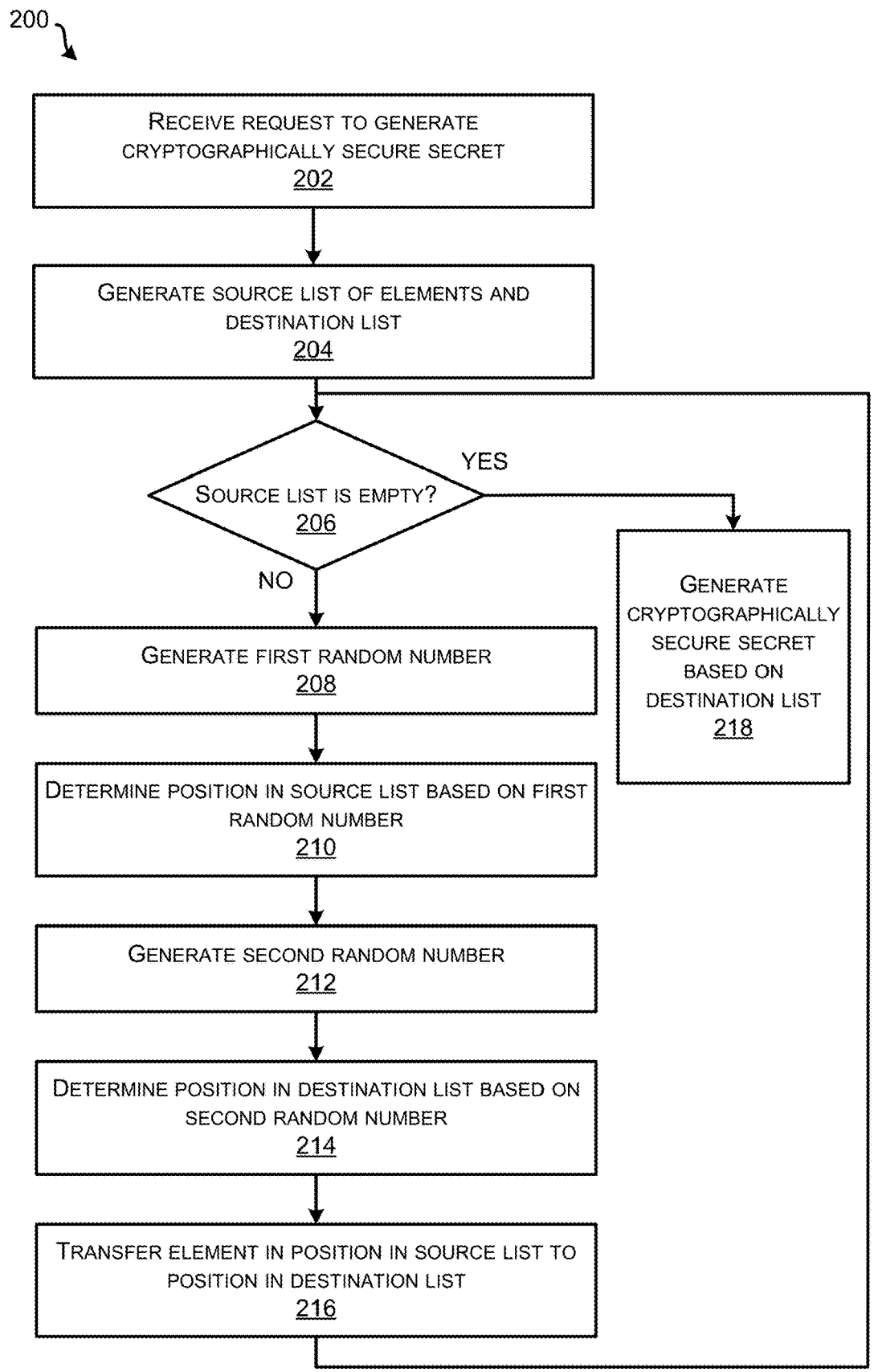
FIG. 2 depicts an example flowchart of a process for implementing a cryptographically secure shuffle according to certain embodiments of the present disclosure.
Figure 3:
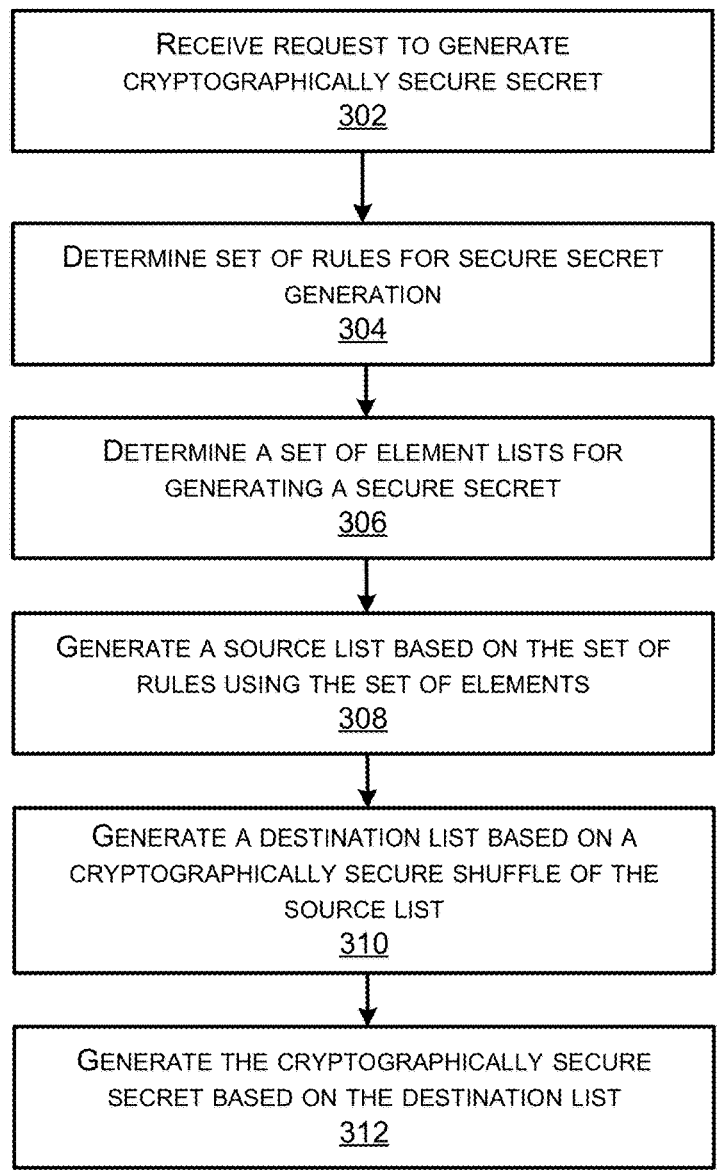
FIG. 3 depicts an example flowchart of a process for generating a secure secret utilizing a cryptographically secure shuffle according to certain embodiments of the present disclosure.
Figure 4:
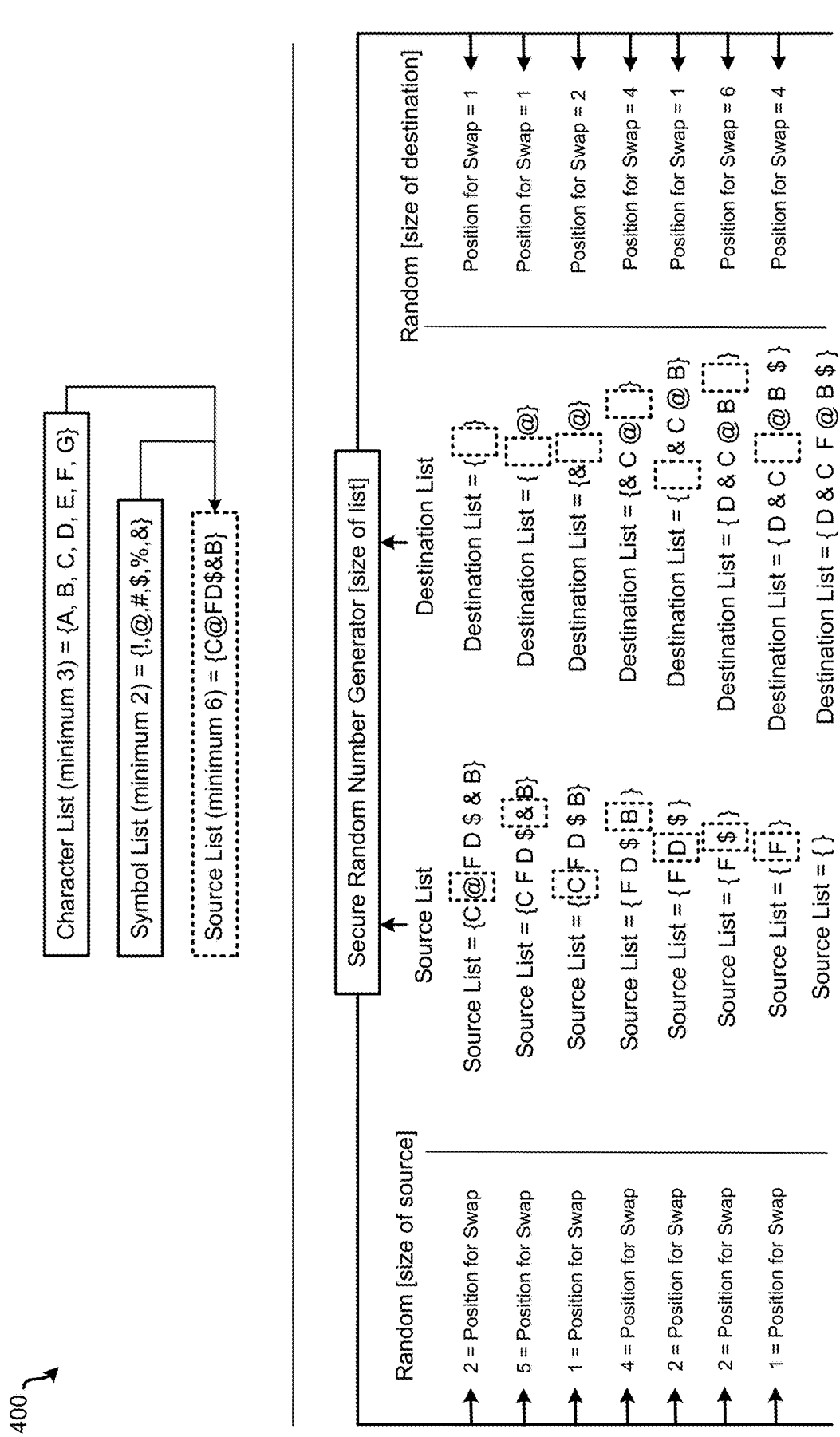
FIG. 4 depicts an example embodiment for generating a secure secret utilizing a cryptographically secure shuffle according to certain embodiments of the present disclosure.

FIG. 2 depicts an example flowchart of a process 200 for implementing a cryptographically secure shuffle according to certain embodiments of the present disclosure. Specifically, FIG. 2 depicts an example flowchart of a process 200 for performing a multi-layer random shuffle of elements in a dataset to form a cryptographically secure dataset. The processing depicted in FIGS. 2, 3, and 4 may be implemented in software (e.g., code, instructions, program) executed by one or more processing units (e.g., processors, cores) of the respective systems, hardware, or combinations thereof. The software may be stored on a non-transitory storage medium (e.g., on a memory device). The methods presented in FIGS. 2, 3, and 4 described below are intended to be illustrative and non-limiting. Although FIGS. 2, 3, and 4 depict the various processing steps occurring in a particular sequence or order, this is not intended to be limiting. In certain alternative embodiments, the steps may be performed in some different order, or some steps may also be performed in parallel.

Process 200 can begin at 202 by receiving a request to perform a cryptographically secure shuffle. The request to perform a cryptographically secure shuffle may be generated, for example, by a secret generation subsystem 118 which has generated an unsecure secret. The request may be received, for example, as part of an API call to cryptographically secure shuffle API 124 as part of a process for generating a cryptographically secure secret. The remaining steps of process 200 may be performed, for example, by steps according to the cryptographically secure shuffle API 124. In this manner, the cryptographically secure shuffle API 124 may be a general-purpose API call that may perform a cryptographically secure shuffle on a series of elements, such as an unsecure secret.

At 204, a source list of elements and a destination list are generated. The source list may be generated, including a list of elements that will be the subject of the cryptographically secure shuffle. For example, the source list may include a list of elements, such as characters, symbols, etc., that will be securely shuffled into a destination list according to a cryptographically secure shuffling process. The destination list may be generated as an empty list or a pre-populated list which will receive additional elements as part of a cryptographically secure shuffling technique. For example, the destination list may be generated with a customer-specific or service-specific prefix/suffix that identifies an entity or service prior to being populated with cryptographically secure data. The size of the source list generated is based on the number of elements generated in the source list in 204. The size of the destination list may be zero, indicating no elements exist in the destination list when generated, or a non-zero whole number indicating a number of preexisting elements in the destination list.

At 206, a determination is made as to whether the source list is empty. The determination of the size of the source list may be used to iterate through the cryptographic shuffling process until all elements of the source list have been moved out of the source list in an unpredictable manner. Thus, so long as the size of the source list if greater than zero, there are additional elements in the source list that must be shuffled into the destination list in a cryptographically secure manner.

At 208, if it is determined in 206 that the source list is not empty, a first random number is generated. The first random number generated may be based on the number of elements in the source list and may be indicative of a position of an element among a listing of elements remaining in the source list. For example, a secure random number generator may receive, as a parameter, a number based on the size of the source list. The random number generator may use a cryptographically secure algorithm to generate a random number between zero and the parameter passed to the random number generator. An example of a secure random number generator may be the SecureRandom class of the JAVA® programming language made available by ORACLE® Corporation as described at docs.oracle.com/javase/8/docs/api/java/security/Secure-
      Random.html.

At 210, a position in the source list is determined based on the first random number. For example, the first random number generated in 208 may be used to identify a random element in the source list corresponding to the random number generated. Because the secure random number generator will generate a cryptographically secure number between 0 and the size of the source list, the random number generated may be used to represent a random position of an element of the remaining elements of the source list. Accordingly, an element at the position in the source list determined may also be identified, and that element may be selected for transference to the destination list as part of the subsequent steps of process 200.

At 212, a second random number is generated. The second random number generated may be based on the number of elements in the destination list and may be indicative of a position at which an element may be inserted into the destination list. For example, a secure random number generator may receive, as a parameter, a number based on the size of the destination. The random number generator may use a cryptographically secure algorithm to generate a random number between zero and the parameter passed to the random number generator. The SecureRandom number generator may be used to generate the second random number as well.

At 214, a position in the destination list is determined based on the second random number. For example, the second random number generated in 212 may be used to identify a random position in the destination list corresponding to the random number generated. Because the secure random number generator will generate a cryptographically secure number between 0 and the size of the destination list (including an additional space for the transference of the element from the source list), the random number generated may be used to represent a random position for an element in the destination list.

At 216, the element in the determined position in the source list is transferred to the determined position in the destination list. The transference of the element from the source list into the destination list is performed according to securely generated random numbers generated in steps 208 and 212. Thus, the transference of the element picked from a random position in the source list to a random position in the destination list constitutes a cryptographically secure "shuffle" of the element between the two lists. A visual process for a cryptographically secure shuffle is illustrated below, including in FIG. 4.

Subsequent to 216, the process 200 starts over at step 206, to determine if the source list is empty after the transfer of the element to the destination list. This effectively iterates process 200 until the source list is empty (i.e., each element in the generated source list has been transferred to the destination list. During the iteration, when it is determined that the source list is empty (i.e., all elements in the source list have been transferred to the destination list), at 218, a cryptographically secure secret is generated based on the destination list. The generation of the cryptographically secure secret may be directly based on the destination list generated as a result of process 200. The cryptographically secure secret may be a compressed representation of the destination list, for example, by compressing the list of elements in the destination list into a character-based string that will be used as the cryptographically secure secret.

Techniques for Secure Secret Generation Using Cryptographically Secure Shuffle

FIG. 3 depicts an example flowchart of a process 300 for generating a secure secret utilizing a cryptographically secure shuffle according to certain embodiments of the present disclosure. Specifically, FIG. 3 depicts an example flowchart of a process 300 for generating a cryptographically secure secret using a cryptographically secure shuffle as described in process 200 of FIG. 2. Process 300 can begin at 302 when a request to generate a cryptographically secure secret is received. For example, the request may be received by secret generation subsystem 118 from automated trigger subsystem 120 in response to a determination that a period of time has elapsed and a new cryptographically secure secret should be generated for a client.

At 304, a set of rules for secure secret generation is determined. For example, secret generation subsystem 118 may determine one or more secret generation rules that a cryptographically secure secret must abide by according to secure conventions established by a service provider. In some embodiments, secret generation subsystem 118 may receive the one or more rules from one or more secure cloud-based services 126, which a client utilizing the cryptographically secure secret will access.

At 306, a set of element lists for generating a secure secret is determined. For example, secret generation subsystem 118 may determine one or more lists of elements that may make up a potential cryptographically secure secret. The cryptographically secure secret will be generated using elements from these one or more lists according to the one or more rules identified in 304. In some embodiments, secret generation subsystem 118 may receive the one or more lists of elements from one or more secure cloud-based services 126 which a client utilizing the cryptographically secure secret will access.

At 308, a source list based on the set of rules is generated using the set of elements. The generation of the source list may be similar to the generation of a source list described in block 204 of process 200 in FIG. 2. The generated source list corresponds may adhere to the set of rules and list of elements determined in 304 and 306. For example, the source list may be generated with some minimum number of characters selected from a list of character elements.

At 310, a destination list is generated based on a cryptographically secure shuffle of the source list. The generation of the destination list may be performed according to a cryptographically secure shuffle as described in process 200 in FIG. 2. At 312, the cryptographically secure secret is generated based on the destination list. The generation of the cryptographically secure secret may be similar to block 218 of process 200 in FIG. 2.

FIG. 4 depicts an example embodiment for generating a secure secret utilizing a cryptographically secure shuffle according to certain embodiments of the present disclosure. Specifically, FIG. 4 depicts an example process 400 for generating a cryptographically secure secret using a set of elements, a set of element rules, and a cryptographically secure shuffle.

Process 400 begins with the generation of a source list based on a set of rules and a set of elements. For example, the source list generated in process 400 corresponds to several rules: the source list must have a minimum of six elements, and the elements must be chosen from a character list (minimum three characters) and a symbol list (minimum two symbols). As depicted in FIG. 4, a source list is generated which adheres to these rules, but contains a total of seven elements, including four characters and three symbols.

The generated source list is then subjected to a cryptographically secure shuffle to shuffle the elements in the source list into the destination list to form a less-predictable cryptographically secure secret. This is performed using a secure random number generator based on the size of the list for which the random number being generated as input. In the first step of the cryptographically secure shuffle, the size of the source list is used as a parameter to generate the secure random number "2." This corresponds to a second position of the source list and the element in the second position of the source list is selected. The size of the destination list (plus 1) is sent to the secure random number generator to generate the random number "1." This corresponds to the first position of the destination list. As part of the shuffle, the element "@" is shuffled from the second position of the source list to the first position of the destination list. This process continues iteratively until the last element of the source list "F" is shuffled into the fourth position of the destination list according to the random numbers generated for that iteration. The resulting destination list may be transformed into a cryptographically secure secret based on the ordering of the elements therein as a result of the cryptographically secure shuffle.

In various embodiments not depicted in FIG. 4, additional layers of randomness may be added to the generation of a cryptographically secure secret beyond the first two layers of generating random numbers for the source list and destination list. For example, a third layer of random numbers may be utilized to determine the selection of characters from a listing of elements for insertion into the source list prior to the cryptographically secure shuffle. A fourth layer of random numbers may be utilized to select the position of the source list into which the randomly selected element is inserted. A fifth layer of random number may be utilized to select a list of elements from which to select the randomly selected element for insertion into the source list. A sixth layer of random numbers may be utilized to "pad" the resulting source list or cryptographically secure secret with additional elements once the source list or cryptographically secure secret has been generated.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing, and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed may first need to be set up. In some instances, the provisioning can be done manually, a provisioning tool may be utilized to provision the resources, and/or deployment tools may be utilized to deploy the code once the infrastructure is provisioned.

Figure 5:
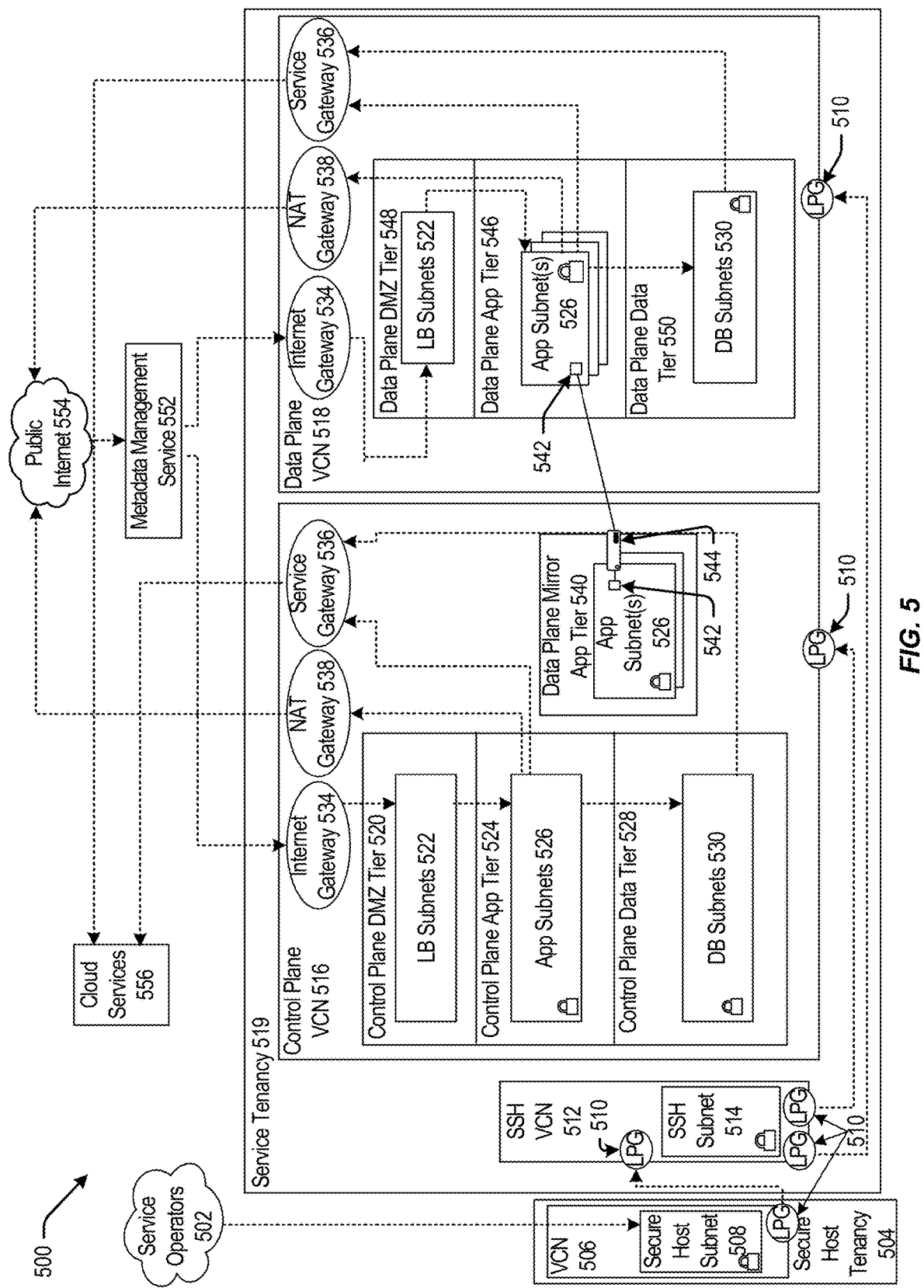
FIG. 5 is a block diagram illustrating a pattern for implementing a cloud infrastructure as a service system, according to at least one embodiment.

FIG. 5 is a block diagram 500 illustrating an example pattern of an IaaS architecture, according to at least one embodiment. Service operators 502 can be communicatively coupled to a secure host tenancy 504 that can include a virtual cloud network (VCN) 506 and a secure host subnet 508. In some examples, the service operators 502 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 14, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 506 and/or the Internet.

The VCN 506 can include a local peering gateway (LPG) 510 that can be communicatively coupled to a secure shell (SSH) VCN 512 via an LPG 510 contained in the SSH VCN 512. The SSH VCN 512 can include an SSH subnet 514, and the SSH VCN 512 can be communicatively coupled to a control plane VCN 516 via the LPG 510 contained in the control plane VCN 516. Also, the SSH VCN 512 can be communicatively coupled to a data plane VCN 518 via an LPG 510. The control plane VCN 516 and the data plane VCN 518 can be contained in a service tenancy 519 that can be owned and/or operated by the IaaS provider.

The control plane VCN 516 can include a control plane demilitarized zone (DMZ) tier 520 that acts as a perimeter network (e.g., portions of a corporate network between the corporate intranet and external networks). The DMZ-based servers may have restricted responsibilities and help keep breaches contained. Additionally, the DMZ tier 520 can include one or more load balancer (LB) subnet(s) 522, a control plane app tier 524 that can include app subnet(s) 526, a control plane data tier 528 that can include database (DB) subnet(s) 530 (e.g., frontend DB subnet(s) and/or backend DB subnet(s)). The LB subnet(s) 522 contained in the control plane DMZ tier 520 can be communicatively coupled to the app subnet(s) 526 contained in the control plane app tier 524 and an Internet gateway 534 that can be contained in the control plane VCN 516, and the app subnet(s) 526 can be communicatively coupled to the DB subnet(s) 530 contained in the control plane data tier 528 and a service gateway 536 and a network address translation (NAT) gateway 538. The control plane VCN 516 can include the service gateway 536 and the NAT gateway 538.

The control plane VCN 516 can include a data plane mirror app tier 540 that can include app subnet(s) 526. The app subnet(s) 526 contained in the data plane mirror app tier 540 can include a virtual network interface controller (VNIC) 542 that can execute a compute instance 544. The compute instance 544 can communicatively couple the app subnet(s) 526 of the data plane mirror app tier 540 to app subnet(s) 526 that can be contained in a data plane app tier 546.

The data plane VCN 518 can include the data plane app tier 546, a data plane DMZ tier 548, and a data plane data tier 550. The data plane DMZ tier 548 can include LB subnet(s) 522 that can be communicatively coupled to the app subnet(s) 526 of the data plane app tier 546 and the Internet gateway 534 of the data plane VCN 518. The app subnet(s) 526 can be communicatively coupled to the service gateway 536 of the data plane VCN 518 and the NAT gateway 538 of the data plane VCN 518. The data plane data tier 550 can also include the DB subnet(s) 530 that can be communicatively coupled to the app subnet(s) 526 of the data plane app tier 546.

The Internet gateway 534 of the control plane VCN 516 and of the data plane VCN 518 can be communicatively coupled to a metadata management service 552 that can be communicatively coupled to public Internet 554. Public Internet 554 can be communicatively coupled to the NAT gateway 538 of the control plane VCN 516 and of the data plane VCN 518. The service gateway 536 of the control plane VCN 516 and of the data plane VCN 518 can be communicatively couple to cloud services 556.

In some examples, the service gateway 536 of the control plane VCN 516 or of the data plane VCN 518 can make application programming interface (API) calls to cloud services 556 without going through public Internet 554. The API calls to cloud services 556 from the service gateway 536 can be one-way: the service gateway 536 can make API calls to cloud services 556, and cloud services 556 can send requested data to the service gateway 536. But, cloud services 556 may not initiate API calls to the service gateway 536.

In some examples, the secure host tenancy 504 can be directly connected to the service tenancy 519, which may be otherwise isolated. The secure host subnet 508 can communicate with the SSH subnet 514 through an LPG 510 that may enable two-way communication over an otherwise isolated system. Connecting the secure host subnet 508 to the SSH subnet 514 may give the secure host subnet 508 access to other entities within the service tenancy 519.

The control plane VCN 516 may allow users of the service tenancy 519 to set up or otherwise provision desired resources. Desired resources provisioned in the control plane VCN 516 may be deployed or otherwise used in the data plane VCN 518. In some examples, the control plane VCN 516 can be isolated from the data plane VCN 518, and the data plane mirror app tier 540 of the control plane VCN 516 can communicate with the data plane app tier 546 of the data plane VCN 518 via VNICs 542 that can be contained in the data plane mirror app tier 540 and the data plane app tier 546.

In some examples, users of the system, or customers, can make requests, for example create, read, update, or delete (CRUD) operations, through public Internet 554 that can communicate the requests to the metadata management service 552. The metadata management service 552 can communicate the request to the control plane VCN 516 through the Internet gateway 534. The request can be received by the LB subnet(s) 522 contained in the control plane DMZ tier 520. The LB subnet(s) 522 may determine that the request is valid, and in response to this determination, the LB subnet(s) 522 can transmit the request to app subnet(s) 526 contained in the control plane app tier 524. If the request is validated and requires a call to public Internet 554, the call to public Internet 554 may be transmitted to the NAT gateway 538 that can make the call to public Internet 554. Memory that may be desired to be stored by the request can be stored in the DB subnet(s) 530.

In some examples, the data plane mirror app tier 540 can facilitate direct communication between the control plane VCN 516 and the data plane VCN 518. For example, changes, updates, or other suitable modifications to configuration may be desired to be applied to the resources contained in the data plane VCN 518. Via a VNIC 542, the control plane VCN 516 can directly communicate with, and can thereby execute the changes, updates, or other suitable modifications to configuration to, resources contained in the data plane VCN 518.

In some embodiments, the control plane VCN 516 and the data plane VCN 518 can be contained in the service tenancy 519. In this case, the user, or the customer, of the system may not own or operate either the control plane VCN 516 or the data plane VCN 518. Instead, the IaaS provider may own or operate the control plane VCN 516 and the data plane VCN 518, both of which may be contained in the service tenancy 519. This embodiment can enable isolation of networks that may prevent users or customers from interacting with other users', or other customers', resources. Also, this embodiment may allow users or customers of the system to store databases privately without needing to rely on public Internet 554, which may not have a desired level of threat prevention, for storage.

In other embodiments, the LB subnet(s) 522 contained in the control plane VCN 516 can be configured to receive a signal from the service gateway 536. In this embodiment, the control plane VCN 516 and the data plane VCN 518 may be configured to be called by a customer of the IaaS provider without calling public Internet 554. Customers of the IaaS provider may desire this embodiment since database(s) that the customers use may be controlled by the IaaS provider and may be stored on the service tenancy 519, which may be isolated from public Internet 554.

Figure 6:
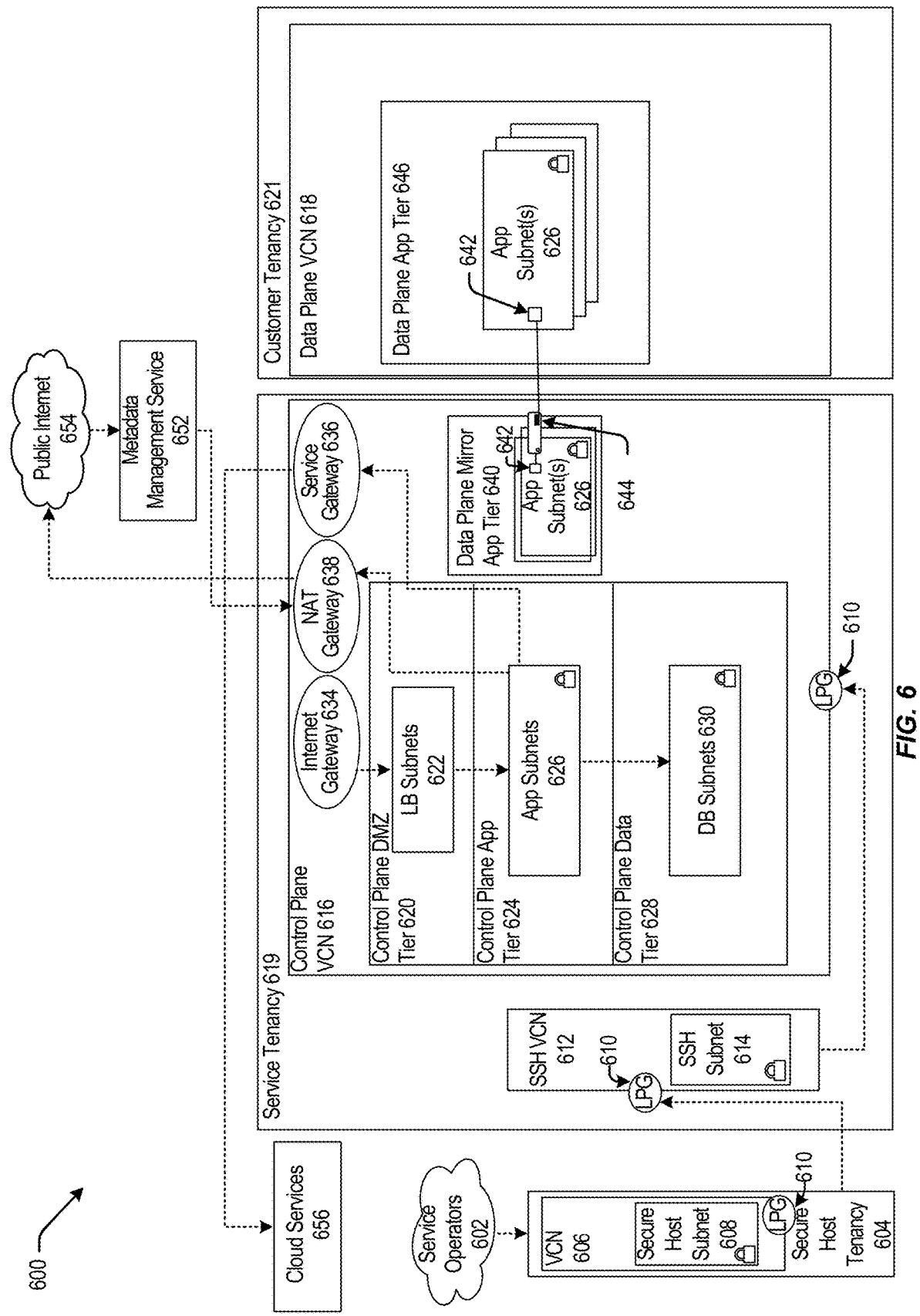
FIG. 6 is a block diagram illustrating another pattern for implementing a cloud infrastructure as a service system, according to at least one embodiment.

FIG. 6 is a block diagram 600 illustrating another example pattern of an IaaS architecture, according to at least one embodiment. Service operators 602 (e.g., service operators 502 of FIG. 5) can be communicatively coupled to a secure host tenancy 604 (e.g., the secure host tenancy 504 of FIG. 5) that can include a virtual cloud network (VCN) 606 (e.g., the VCN 506 of FIG. 5) and a secure host subnet 608 (e.g., the secure host subnet 508 of FIG. 5). The VCN 676 can include a local peering gateway (LPG) 610 (e.g., the LPG 510 of FIG. 5) that can be communicatively coupled to a secure shell (SSH) VCN 612 (e.g., the SSH VCN 512 of FIG. 5) via an LPG 610 contained in the SSH VCN 612. The SSH VCN 612 can include an SSH subnet 614 (e.g., the SSH subnet 514 of FIG. 5), and the SSH VCN 612 can be communicatively coupled to a control plane VCN 616 (e.g., the control plane VCN 516 of FIG. 5) via an LPG 610 contained in the control plane VCN 616. The control plane VCN 616 can be contained in a service tenancy 619 (e.g., the service tenancy 519 of FIG. 5), and the data plane VCN 618 (e.g., the data plane VCN 518 of FIG. 5) can be contained in a customer tenancy 621 that may be owned or operated by users, or customers, of the system.

The control plane VCN 616 can include a control plane DMZ tier 620 (e.g., the control plane DMZ tier 520 of FIG. 5) that can include LB subnet(s) 622 (e.g., LB subnet(s) 522 of FIG. 5), a control plane app tier 624 (e.g., the control plane app tier 524 of FIG. 5) that can include app subnet(s) 626 (e.g., app subnet(s) 526 of FIG. 5), a control plane data tier 628 (e.g., the control plane data tier 528 of FIG. 5) that can include database (DB) subnet(s) 630 (e.g., similar to DB subnet(s) 530 of FIG. 5). The LB subnet(s) 622 contained in the control plane DMZ tier 620 can be communicatively coupled to the app subnet(s) 626 contained in the control plane app tier 624 and an Internet gateway 634 (e.g., the Internet gateway 534 of FIG. 5) that can be contained in the control plane VCN 616, and the app subnet(s) 626 can be communicatively coupled to the DB subnet(s) 630 contained in the control plane data tier 628 and a service gateway 636 (e.g., the service gateway 536 of FIG. 5) and a network address translation (NAT) gateway 638 (e.g., the NAT gateway 538 of FIG. 5). The control plane VCN 616 can include the service gateway 636 and the NAT gateway 638.

The control plane VCN 616 can include a data plane mirror app tier 640 (e.g., the data plane mirror app tier 540 of FIG. 5) that can include app subnet(s) 626. The app subnet(s) 626 contained in the data plane mirror app tier 640 can include a virtual network interface controller (VNIC) 642 (e.g., the VNIC of 542 of FIG. 5) that can execute a compute instance 644 (e.g., similar to the compute instance 544 of FIG. 5). The compute instance 644 can facilitate communication between the app subnet(s) 626 of the data plane mirror app tier 640 and the app subnet(s) 626 that can be contained in a data plane app tier 646 (e.g., the data plane app tier 646 of FIG. 6) via the VNIC 642 contained in the data plane mirror app tier 640 and the VNIC 642 contained in the data plane app tier 646.

The Internet gateway 634 contained in the control plane VCN 616 can be communicatively coupled to a metadata management service 652 (e.g., the metadata management service 502 of FIG. 5) that can be communicatively coupled to public Internet 654 (e.g., public Internet 504 of FIG. 5). Public Internet 654 can be communicatively coupled to the NAT gateway 638 contained in the control plane VCN 616. The service gateway 636 contained in the control plane VCN 616 can be communicatively couple to cloud services 656 (e.g., cloud services 556 of FIG. 5).

In some examples, the data plane VCN 618 can be contained in the customer tenancy 621. In this case, the IaaS provider may provide the control plane VCN 616 for each customer, and the IaaS provider may, for each customer, set up a unique compute instance 644 that is contained in the service tenancy 619. Each compute instance 644 may allow communication between the control plane VCN 616, contained in the service tenancy 619, and the data plane VCN 618 that is contained in the customer tenancy 621. The compute instance 644 may allow resources, that are provisioned in the control plane VCN 616 that is contained in the service tenancy 619, to be deployed or otherwise used in the data plane VCN 618 that is contained in the customer tenancy 621.

In other examples, the customer of the IaaS provider may have databases that live in the customer tenancy 621. In this example, the control plane VCN 616 can include the data plane mirror app tier 640 that can include app subnet(s) 626. The data plane mirror app tier 640 can reside in the data plane VCN 618, but the data plane mirror app tier 640 may not live in the data plane VCN 618. That is, the data plane mirror app tier 640 may have access to the customer tenancy 621, but the data plane mirror app tier 640 may not exist in the data plane VCN 618 or be owned or operated by the customer of the IaaS provider. The data plane mirror app tier 640 may be configured to make calls to the data plane VCN 618 but may not be configured to make calls to any entity contained in the control plane VCN 616. The customer may desire to deploy or otherwise use resources in the data plane VCN 618 that are provisioned in the control plane VCN 616, and the data plane mirror app tier 640 can facilitate the desired deployment, or other usage of resources, of the customer.

In some embodiments, the customer of the IaaS provider can apply filters to the data plane VCN 618. In this embodiment, the customer can determine what the data plane VCN 618 can access, and the customer may restrict access to public Internet 654 from the data plane VCN 618. The IaaS provider may not be able to apply filters or otherwise control access of the data plane VCN 618 to any outside networks or databases. Applying filters and controls by the customer onto the data plane VCN 618, contained in the customer tenancy 621, can help isolate the data plane VCN 618 from other customers and from public Internet 654.

In some embodiments, cloud services 656 can be called by the service gateway 636 to access services that may not exist on public Internet 654, on the control plane VCN 616, or on the data plane VCN 618. The connection between cloud services 656 and the control plane VCN 616 or the data plane VCN 618 may not be live or continuous. Cloud services 656 may exist on a different network owned or operated by the IaaS provider. Cloud services 656 may be configured to receive calls from the service gateway 636 and may be configured to not receive calls from public Internet 654. Some cloud services 656 may be isolated from other cloud services 656, and the control plane VCN 616 may be isolated from cloud services 656 that may not be in the same region as the control plane VCN 616. For example, the control plane VCN 616 may be located in "Region 1," and cloud service "Deployment 1," may be located in Region 1 and in "Region 2." If a call to Deployment 1 is made by the service gateway 636 contained in the control plane VCN 616 located in Region 1, the call may be transmitted to Deployment 1 in Region 1. In this example, the control plane VCN 616, or Deployment 1 in Region 1, may not be communicatively coupled to, or otherwise in communication with, Deployment 2 in Region 2.

Figure 7:
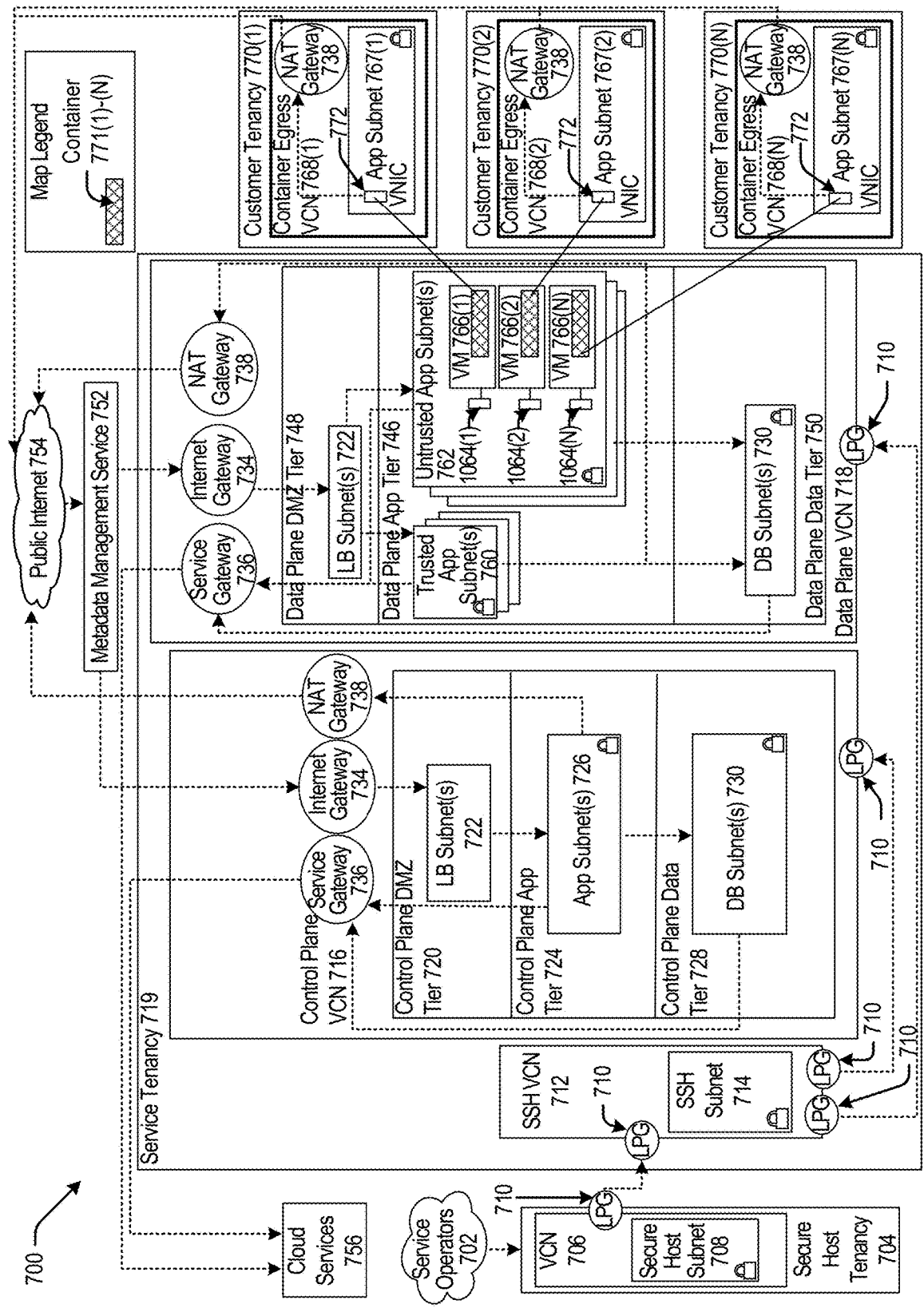
FIG. 7 is a block diagram illustrating another pattern for implementing a cloud infrastructure as a service system, according to at least one embodiment.

FIG. 7 is a block diagram 700 illustrating another example pattern of an IaaS architecture, according to at least one embodiment. Service operators 702 (e.g., service operators 502 of FIG. 5) can be communicatively coupled to a secure host tenancy 704 (e.g., the secure host tenancy 504 of FIG. 5) that can include a virtual cloud network (VCN) 706 (e.g., the VCN 706 of FIG. 5) and a secure host subnet 708 (e.g., the secure host subnet 508 of FIG. 5). The VCN 706 can include an LPG 710 (e.g., the LPG 510 of FIG. 5) that can be communicatively coupled to an SSH VCN 712 (e.g., the SSH VCN 512 of FIG. 5) via an LPG 710 contained in the SSH VCN 712. The SSH VCN 712 can include an SSH subnet 714 (e.g., the SSH subnet 514 of FIG. 5), and the SSH VCN 712 can be communicatively coupled to a control plane VCN 716 (e.g., the control plane VCN 516 of FIG. 5) via an LPG 710 contained in the control plane VCN 716 and to a data plane VCN 718 (e.g., the data plane 518 of FIG. 5) via an LPG 710 contained in the data plane VCN 718. The control plane VCN 716 and the data plane VCN 718 can be contained in a service tenancy 719 (e.g., the service tenancy 519 of FIG. 5).

The control plane VCN 716 can include a control plane DMZ tier 720 (e.g., the control plane DMZ tier 520 of FIG. 5) that can include load balancer (LB) subnet(s) 722 (e.g., LB subnet(s) 522 of FIG. 5), a control plane app tier 724 (e.g., the control plane app tier 524 of FIG. 5) that can include app subnet(s) 726 (e.g., similar to app subnet(s) 526 of FIG. 5), a control plane data tier 728 (e.g., the control plane data tier 528 of FIG. 5) that can include DB subnet(s) 730. The LB subnet(s) 722 contained in the control plane DMZ tier 720 can be communicatively coupled to the app subnet(s) 726 contained in the control plane app tier 724 and to an Internet gateway 734 (e.g., the Internet gateway 534 of FIG. 5) that can be contained in the control plane VCN 716, and the app subnet(s) 726 can be communicatively coupled to the DB subnet(s) 730 contained in the control plane data tier 728 and to a service gateway 736 (e.g., the service gateway 536 of FIG. 5) and a network address translation (NAT) gateway 738 (e.g., the NAT gateway 538 of FIG. 5). The control plane VCN 716 can include the service gateway 736 and the NAT gateway 738.

The data plane VCN 718 can include a data plane app tier 746 (e.g., the data plane app tier 546 of FIG. 5), a data plane DMZ tier 748 (e.g., the data plane DMZ tier 548 of FIG. 5), and a data plane data tier 750 (e.g., the data plane data tier 550 of FIG. 5). The data plane DMZ tier 748 can include LB subnet(s) 722 that can be communicatively coupled to trusted app subnet(s) 760 and untrusted app subnet(s) 762 of the data plane app tier 746 and the Internet gateway 734 contained in the data plane VCN 718. The trusted app subnet(s) 760 can be communicatively coupled to the service gateway 736 contained in the data plane VCN 718, the NAT gateway 738 contained in the data plane VCN 718, and DB subnet(s) 730 contained in the data plane data tier 750. The untrusted app subnet(s) 762 can be communicatively coupled to the service gateway 736 contained in the data plane VCN 718 and DB subnet(s) 730 contained in the data plane data tier 750. The data plane data tier 750 can include DB subnet(s) 730 that can be communicatively coupled to the service gateway 736 contained in the data plane VCN 718.

The untrusted app subnet(s) 762 can include one or more primary VNICs 764(1)-(N) that can be communicatively coupled to tenant virtual machines (VMs) 766(1)-(N). Each tenant VM 766(1)-(N) can be communicatively coupled to a respective app subnet 767(1)-(N) that can be contained in respective container egress VCNs 768(1)-(N) that can be contained in respective customer tenancies 770(1)-(N). Respective secondary VNICs 772(1)-(N) can facilitate communication between the untrusted app subnet(s) 762 contained in the data plane VCN 718 and the app subnet contained in the container egress VCNs 768(1)-(N). Each container egress VCNs 768(1)-(N) can include a NAT gateway 738 that can be communicatively coupled to public Internet 754 (e.g., public Internet 554 of FIG. 5). The Internet gateway 734 contained in the control plane VCN 716 and contained in the data plane VCN 718 can be communicatively coupled to a metadata management service 752 (e.g., the metadata management system 552 of FIG. 5) that can be communicatively coupled to public Internet 754. Public Internet 754 can be communicatively coupled to the NAT gateway 738 contained in the control plane VCN 716 and contained in the data plane VCN 718. The service gateway 736 contained in the control plane VCN 716 and contained in the data plane VCN 718 can be communicatively couple to cloud services 756.

In some embodiments, the data plane VCN 718 can be integrated with customer tenancies 770. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 746. Code to run the function may be executed in the VMs 766(1)-(N), and the code may not be configured to run anywhere else on the data plane VCN 718. Each VM 766(1)-(N) may be connected to one customer tenancy 770. Respective containers 771(1)-(N) contained in the VMs 766(1)-(N) may be configured to run the code. In this case, there can be a dual isolation (e.g., the containers 771(1)-(N) running code, where the containers 771(1)-(N) may be contained in at least the VM 766(1)-(N) that are contained in the untrusted app subnet(s) 762), which may help prevent incorrect or otherwise undesirable code from damaging the network of the IaaS provider or from damaging a network of a different customer. The containers 771(1)-(N) may be communicatively coupled to the customer tenancy 770 and may be configured to transmit or receive data from the customer tenancy 770. The containers 771(1)-(N) may not be configured to transmit or receive data from any other entity in the data plane VCN 718. Upon completion of running the code, the IaaS provider may kill or otherwise dispose of the containers 771(1)-(N).

In some embodiments, the trusted app subnet(s) 760 may run code that may be owned or operated by the IaaS provider. In this embodiment, the trusted app subnet(s) 760 may be communicatively coupled to the DB subnet(s) 730 and be configured to execute CRUD operations in the DB subnet(s) 730. The untrusted app subnet(s) 762 may be communicatively coupled to the DB subnet(s) 730, but in this embodiment, the untrusted app subnet(s) may be configured to execute read operations in the DB subnet(s) 730. The containers 771(1)-(N) that can be contained in the VM 766(1)-(N) of each customer and that may run code from the customer may not be communicatively coupled with the DB subnet(s) 730.

In other embodiments, the control plane VCN 716 and the data plane VCN 718 may not be directly communicatively coupled. In this embodiment, there may be no direct communication between the control plane VCN 716 and the data plane VCN 718. However, communication can occur indirectly through at least one method. An LPG 710 may be established by the IaaS provider that can facilitate communication between the control plane VCN 716 and the data plane VCN 718. In another example, the control plane VCN 716 or the data plane VCN 718 can make a call to cloud services 756 via the service gateway 736. For example, a call to cloud services 756 from the control plane VCN 716 can include a request for a service that can communicate with the data plane VCN 718.

Figure 8:
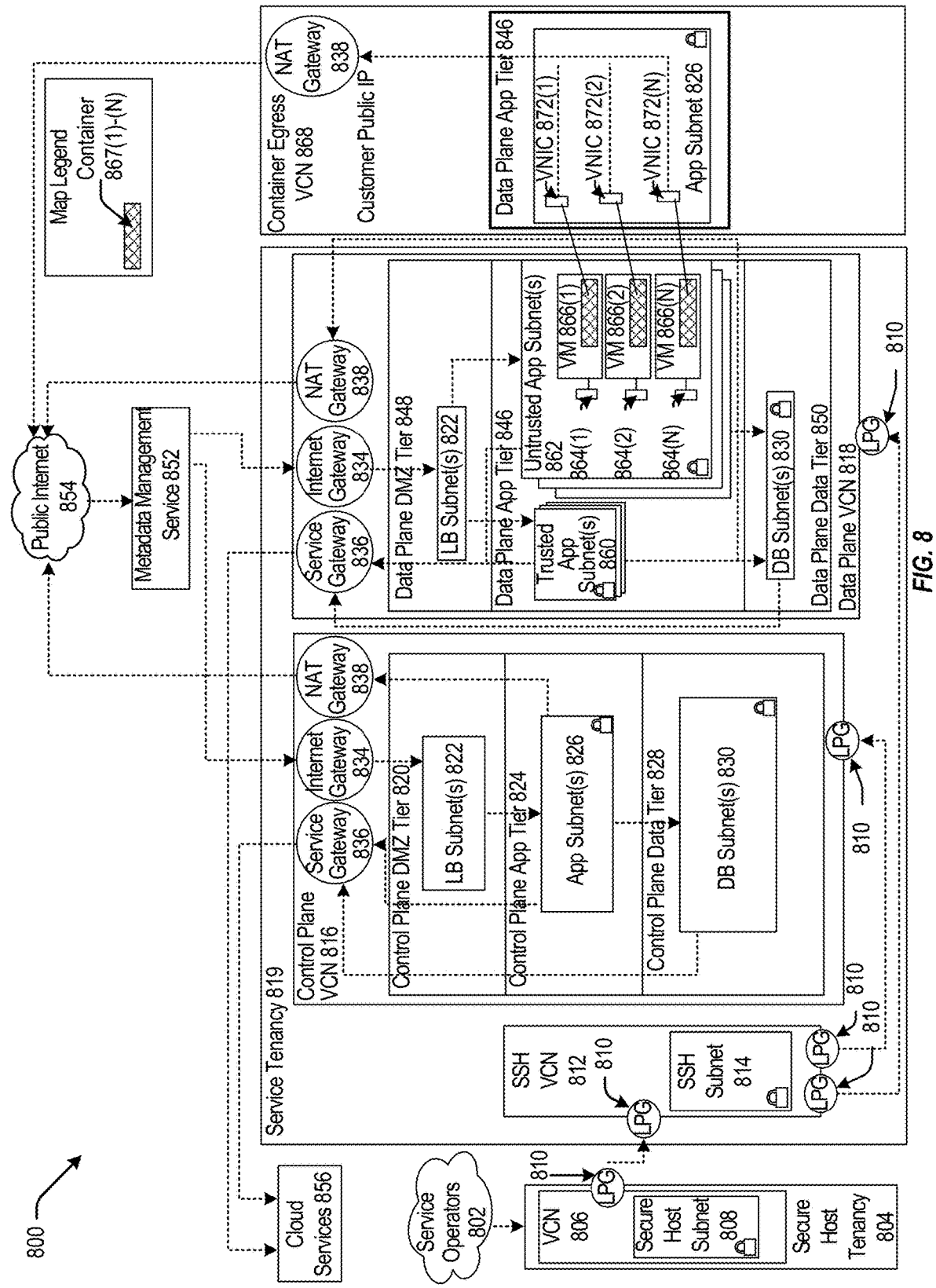
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g., service operators 502 of FIG. 5) can be communicatively coupled to a secure host tenancy 804 (e.g., the secure host tenancy 504 of FIG. 5) that can include a virtual cloud network (VCN) 806 (e.g., the VCN 506 of FIG. 5) and a secure host subnet 808 (e.g., the secure host subnet 508 of FIG. 5). The VCN 806 can include an LPG 810 (e.g., the LPG 510 of FIG. 5) that can be communicatively coupled to an SSH VCN 812 (e.g., the SSH VCN 512 of FIG. 5) via an LPG 810 contained in the SSH VCN 812. The SSH VCN 812 can include an SSH subnet 814 (e.g., the SSH subnet 514 of FIG. 5), and the SSH VCN 812 can be communicatively coupled to a control plane VCN 816 (e.g., the control plane VCN 516 of FIG. 5) via an LPG 810 contained in the control plane VCN 816 and to a data plane VCN 818 (e.g., the data plane 518 of FIG. 5) via an LPG 810 contained in the data plane VCN 818. The control plane VCN 816 and the data plane VCN 818 can be contained in a service tenancy 819 (e.g., the service tenancy 519 of FIG. 5).

The control plane VCN 816 can include a control plane DMZ tier 820 (e.g., the control plane DMZ tier 520 of FIG. 5) that can include LB subnet(s) 822 (e.g., LB subnet(s) 522 of FIG. 5), a control plane app tier 824 (e.g., the control plane app tier 524 of FIG. 5) that can include app subnet(s) 826 (e.g., app subnet(s) 526 of FIG. 5), a control plane data tier 828 (e.g., the control plane data tier 528 of FIG. 5) that can include DB subnet(s) 830 (e.g., DB subnet(s) 530 of FIG. 5). The LB subnet(s) 822 contained in the control plane DMZ tier 820 can be communicatively coupled to the app subnet(s) 826 contained in the control plane app tier 824 and to an Internet gateway 834 (e.g., the Internet gateway 534 of FIG. 5) that can be contained in the control plane VCN 816, and the app subnet(s) 826 can be communicatively coupled to the DB subnet(s) 830 contained in the control plane data tier 828 and to a service gateway 836 (e.g., the service gateway 536 of FIG. 5) and a network address translation (NAT) gateway 838 (e.g., the NAT gateway 538 of FIG. 5). The control plane VCN 816 can include the service gateway 836 and the NAT gateway 838.

The data plane VCN 818 can include a data plane app tier 846 (e.g., the data plane app tier 546 of FIG. 5), a data plane DMZ tier 848 (e.g., the data plane DMZ tier 548 of FIG. 5), and a data plane data tier 850 (e.g., the data plane data tier 550 of FIG. 5). The data plane DMZ tier 848 can include LB subnet(s) 822 that can be communicatively coupled to trusted app subnet(s) 860 (e.g., trusted app subnet(s) 760 of FIG. 7) and untrusted app subnet(s) 862 (e.g., untrusted app subnet(s) 762 of FIG. 7) of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include primary VNICs 864(1)-(N) that can be communicatively coupled to tenant virtual machines (VMs) 866(1)-(N) residing within the untrusted app subnet(s) 862. Each tenant VM 866(1)-(N) can run code in a respective container 867(1)-(N), and be communicatively coupled to an app subnet 826 that can be contained in a data plane app tier 846 that can be contained in a container egress VCN 868. Respective secondary VNICs 872(1)-(N) can facilitate communication between the untrusted app subnet(s) 862 contained in the data plane VCN 818 and the app subnet contained in the container egress VCN 868. The container egress VCN can include a NAT gateway 838 that can be communicatively coupled to public Internet 854 (e.g., public Internet 554 of FIG. 5).

The Internet gateway 834 contained in the control plane VCN 816 and contained in the data plane VCN 818 can be communicatively coupled to a metadata management service 852 (e.g., the metadata management system 552 of FIG. 5) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively couple to cloud services 856.

In some examples, the pattern illustrated by the architecture of block diagram 800 of FIG. 8 may be considered an exception to the pattern illustrated by the architecture of block diagram 700 of FIG. 7 and may be desirable for a customer of the IaaS provider if the IaaS provider cannot directly communicate with the customer (e.g., a disconnected region). The respective containers 867(1)-(N) that are contained in the VMs 866(1)-(N) for each customer can be accessed in real-time by the customer. The containers 867(1)-(N) may be configured to make calls to respective secondary VNICs 872(1)-(N) contained in app subnet(s) 826 of the data plane app tier 846 that can be contained in the container egress VCN 868. The secondary VNICs 872(1)-(N) can transmit the calls to the NAT gateway 838 that may transmit the calls to public Internet 854. In this example, the containers 867(1)-(N) that can be accessed in real-time by the customer can be isolated from the control plane VCN 816 and can be isolated from other entities contained in the data plane VCN 818. The containers 867(1)-(N) may also be isolated from resources from other customers.

In other examples, the customer can use the containers 867(1)-(N) to call cloud services 856. In this example, the customer may run code in the containers 867(1)-(N) that requests a service from cloud services 856. The containers 867(1)-(N) can transmit this request to the secondary VNICs 872(1)-(N) that can transmit the request to the NAT gateway that can transmit the request to public Internet 854. Public Internet 854 can transmit the request to LB subnet(s) 822 contained in the control plane VCN 816 via the Internet gateway 834. In response to determining the request is valid, the LB subnet(s) can transmit the request to app subnet(s) 826 that can transmit the request to cloud services 856 via the service gateway 836.

It should be appreciated that IaaS architectures 500, 600, 700, 800 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 9:
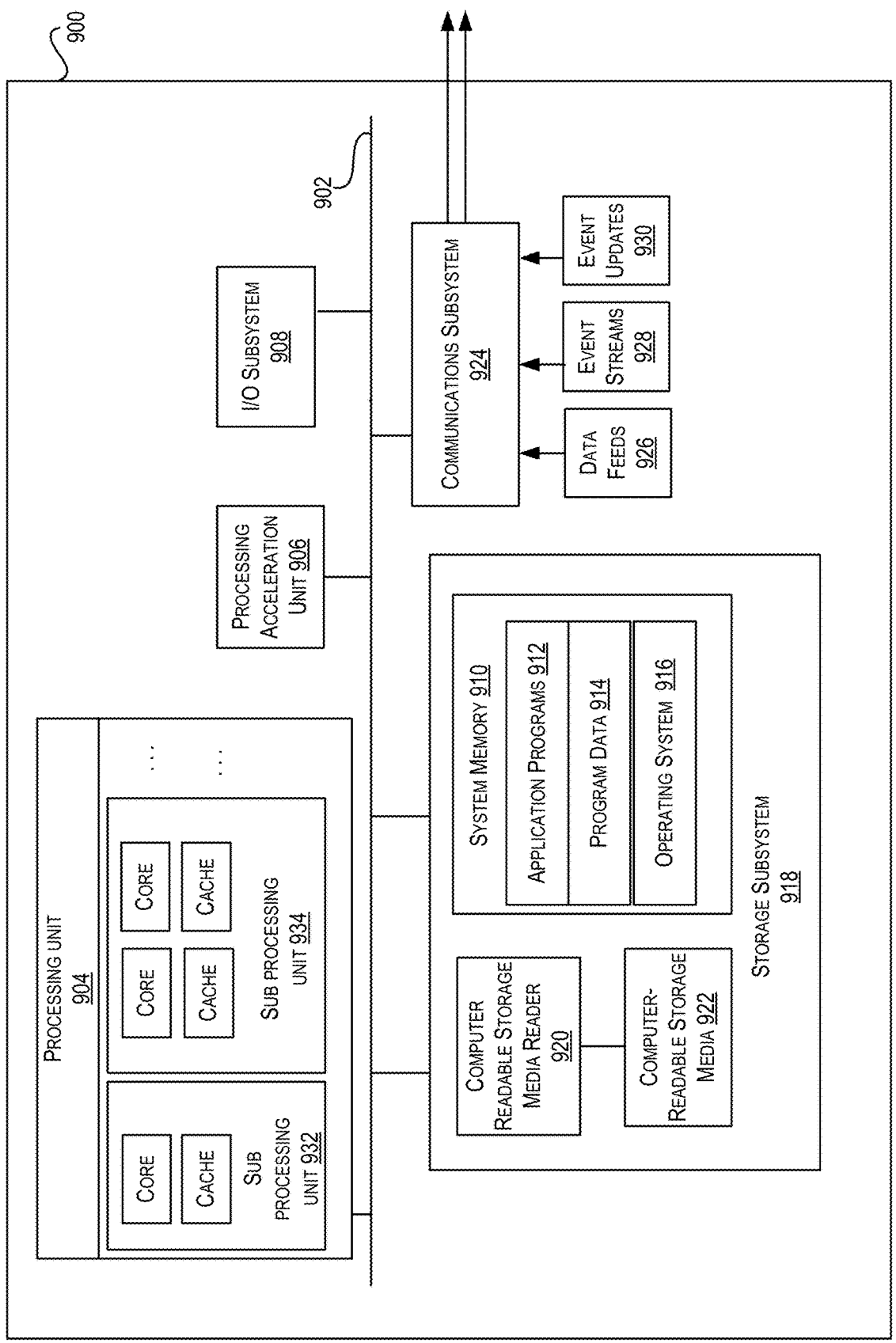
FIG. 9 is a block diagram illustrating an example computer system, according to at least one embodiment.

FIG. 9 illustrates an example computer system 900, in which various embodiments may be implemented. The system 900 may be used to implement any of the computer systems described above. As shown in the figure, computer system 900 includes a processing unit 904 that communicates with a number of peripheral subsystems via a bus subsystem 902. These peripheral subsystems may include a processing acceleration unit 906, an I/O subsystem 908, a storage subsystem 918 and a communications subsystem 924. Storage subsystem 918 includes tangible computer-readable storage media 922 and a system memory 910.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 904, which can be implemented as one or more integrated circuits (e.g., a conventional microprocessor or microcontroller), controls the operation of computer system 900. One or more processors may be included in processing unit 904. These processors may include single core or multicore processors. In certain embodiments, processing unit 904 may be implemented as one or more independent processing units 932 and/or 934 with single or multicore processors included in each processing unit. In other embodiments, processing unit 904 may also be implemented as a quad-core processing unit formed by integrating two dual-core processors into a single chip.

In various embodiments, processing unit 904 can execute a variety of programs in response to program code and can maintain multiple concurrently executing programs or processes. At any given time, some or all of the program code to be executed can be resident in processor(s) 904 and/or in storage subsystem 918. Through suitable programming, processor(s) 904 can provide various functionalities described above. Computer system 900 may additionally include a processing acceleration unit 906, which can include a digital signal processor (DSP), a special-purpose processor, and/or the like.

I/O subsystem 908 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 900 may comprise a storage subsystem 918 that comprises software elements, shown as being currently located within a system memory 910. System memory 910 may store program instructions that are loadable and executable on processing unit 904, as well as data generated during the execution of these programs.

Depending on the configuration and type of computer system 900, system memory 910 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 904. In some implementations, system memory 910 may include multiple different types of memory, such as static random access memory (SRAM) or dynamic random access memory (DRAM). In some implementations, a basic input/output system (BIOS), containing the basic routines that help to transfer information between elements within computer system 900, such as during start-up, may typically be stored in the ROM. By way of example, and not limitation, system memory 910 also illustrates application programs 912, which may include client applications, Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems.

Storage subsystem 918 may also provide a tangible computer-readable storage medium for storing the basic programming and data constructs that provide the functionality of some embodiments. Software (programs, code modules, instructions) that when executed by a processor provide the functionality described above may be stored in storage subsystem 918. These software modules or instructions may be executed by processing unit 904. Storage subsystem 918 may also provide a repository for storing data used in accordance with the present disclosure.

Storage subsystem 900 may also include a computer-readable storage media reader 920 that can further be connected to computer-readable storage media 922. Together and, optionally, in combination with system memory 910, computer-readable storage media 922 may comprehensively represent remote, local, fixed, and/or removable storage devices plus storage media for temporarily and/or more permanently containing, storing, transmitting, and retrieving computer-readable information.

Computer-readable storage media 922 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer-readable media. This can also include nontangible computer-readable media, such as data signals, data transmissions, or any other medium which can be used to transmit the desired information and which can be accessed by computing system 900.

By way of example, computer-readable storage media 922 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 900.

Communications subsystem 924 provides an interface to other computer systems and networks. Communications subsystem 924 serves as an interface for receiving data from and transmitting data to other systems from computer system 900. For example, communications subsystem 924 may enable computer system 900 to connect to one or more devices via the Internet. In some embodiments communications subsystem %524 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 302.11 family standards, or other mobile communication technologies, or any combination thereof), global positioning system (GPS) receiver components, and/or other components. In some embodiments communications subsystem 924 can provide wired network connectivity (e.g., Ethernet) in addition to or instead of a wireless interface.

In some embodiments, communications subsystem 924 may also receive input communication in the form of structured and/or unstructured data feeds 926, event streams 928, event updates 930, and the like on behalf of one or more users who may use computer system 900.

By way of example, communications subsystem 924 may be configured to receive data feeds 926 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 924 may also be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 924 may also be configured to output the structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 900 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:
    generating a source list, wherein generating the source list comprises:
        determining a set of list rules and a set of element lists; and
        selecting a plurality of elements for inclusion in the source list based at least in part on the set of list rules;
    generating a destination list, the source list and the destination list respectively associated with a sequential format, and the source list comprising a plurality of elements in the sequential format;
    generating a first random number and a second random number;
    determining a first element in the source list, the first element of the plurality of elements corresponding to a first source position in the sequential format of the source list based at least in part on the first random number;
    determining a first destination position in the destination list, the first destination position corresponding to a position in the sequential format of the destination list based at least in part on the second random number;
    updating the destination list to include the first element in the source list at the first destination position; and
    repeating a) the generation of the first random number and the second number, and b) the updating of the destination list to include the plurality of elements, until the source list is empty.

2. The computer-implemented method of claim 1, further comprising updating the source list by deleting the first element in the source list from the source list.

3. The computer-implemented method of claim 1, further comprising:
    determining a second element in the source list, the second element corresponding to a second source position in the sequential format of the source list;
    determining a second destination position in the destination list, the second destination position corresponding to a position in the sequential format of the destination list; and
    updating the destination list to include the second element in the source list at the second destination position.

4. The computer-implemented method of claim 1, further comprising:
    receiving a request to generate a cryptographically secure secret; and
    generating based at least in part on the destination list, the cryptographically secure secret, wherein the cryptographically secure secret is generated automatically and in response to receiving the request to generate the cryptographically secure secret.

5. The computer-implemented method of claim 4, wherein the cryptographically secure secret is generated at least in part by compressing the destination list into a string of characters corresponding to a plurality of elements in the destination list.

6. The computer-implemented method of claim 4, wherein:
    the request to generate a cryptographically secure secret is generated by a secret facilitation service at automatically after a fixed period of time;
    the generated cryptographically secure secret to output to the secret facilitation service to replace a previously cryptographically secure secret previously stored during a previous interval of the fixed period of time.

7. The computer-implemented method of claim 1, wherein at least one rule of the set of list rules specifies that a minimum number of elements of at least one element type is selected for inclusion in the source list.

8. The computer-implemented method of claim 1, wherein generating the source list further comprises inserting the plurality of elements into the source list in the sequential format based at least on one or more generated positional random numbers.

9. A computing system comprising:
    one or more data processors; and
    a non-transitory computer-readable storage medium comprising instructions which, when executed on the one or more data processors, cause the one or more data processors to:
        generate a source list, wherein generating the source list comprises:
            determining a set of list rules and a set of element lists; and
            selecting a plurality of elements for inclusion in the source list based at least in part on the set of list rules;
        generate a destination list, the source list and the destination list respectively associated with a sequential format, and the source list comprising a plurality of elements in the sequential format;

generate a first random number and a second random number;

determine a first element in the source list, the first element of the plurality of elements corresponding to a first source position in the sequential format of the source list based at least in part on the first random number;

determine a first destination position in the destination list, the first destination position corresponding to a position in the sequential format of the destination list based at least in part on the second random number;

update the destination list to include the first element in the source list at the first destination position; and repeat a) the generation of the first random number and the second number, and b) the updating of the destination list to include the plurality of elements, until the source list is empty.

10. The computing system of claim 9, wherein the instructions further cause the processor to update the source list by deleting the first element in the source list from the source list.

11. The computing system of claim 9, wherein the instructions further cause the processor to:

generate a third random number and a fourth random number;

determine a second element in the source list, the second element corresponding to a second source position in the sequential format of the source list based at least in part on the third random number;

determine a second destination position in the destination list, the second destination position corresponding to a position in the sequential format of the destination list based at least in part on the fourth random number; and update the destination list to include the second element in the source list at the second destination position.

12. The computing system of claim 9, wherein the instructions further cause the processor to:

receive a request to generate a cryptographically secure secret; and generate based at least in part on the destination list, the cryptographically secure secret, wherein the cryptographically secure secret is generated automatically and in response to receiving the request to generate the cryptographically secure secret.

13. A non-transitory computer-readable medium storing a plurality of instructions executable by one or more processors, the plurality of instructions when executed by the one or more processors, cause the one or more processors to perform operations comprising:

generating a source list, wherein generating the source list comprises:

determining a set of list rules and a set of element lists; and selecting a plurality of elements for inclusion in the source list based at least in part on the set of list rules;

generating a source list and a destination list, the source list and the destination list respectively associated with a sequential format, and the source list comprising a plurality of elements in the sequential format;

generating a first random number and a second random number;

determining a first element in the source list, the first element of the plurality of elements corresponding to a first source position in the sequential format of the source list based at least in part on the first random number;

determining a first destination position in the destination list, the first destination position corresponding to a position in the sequential format of the destination list based at least in part on the second random number;

updating the destination list to include the first element in the source list at the first destination position; and repeating a) the generation of the first random number and the second number, and b) the updating of the destination list to include the plurality of elements, until the source list is empty.

14. The non-transitory computer-readable medium of claim 13, the operations further comprising updating the source list by deleting the first element in the source list from the source list.

15. The non-transitory computer-readable medium of claim 13, the operations further comprising:

generate a third random number and a fourth random number;

determine a second element in the source list, the second element corresponding to a second source position in the sequential format of the source list based at least in part on the third random number;

determine a second destination position in the destination list, the second destination position corresponding to a position in the sequential format of the destination list based at least in part_on the fourth random number; and update the destination list to include the second element in the source list at the second destination position.

16. The non-transitory computer-readable medium of claim 13, the operations further comprising:

receive a request to generate a cryptographically secure secret; and generate based at least in part_on the destination list, the cryptographically secure secret, wherein the cryptographically secure secret is generated automatically and in response to receiving the request to generate the cryptographically secure secret.

\* \* \* \* \*